US012018440B2

(12) United States Patent
Meier

(10) Patent No.: US 12,018,440 B2
(45) Date of Patent: Jun. 25, 2024

(54) SOIL PREPARATION ROLLER SYSTEM FOR A SOIL PREPARATION MACHINE

(71) Applicant: Hamm AG, Tirschenreuth (DE)

(72) Inventor: Matthias Meier, Tirschenreuth (DE)

(73) Assignee: HAMM AG, Tirschenreuth (DE)

(*) Notice: Subject to any disclaimer, the term of this patent is extended or adjusted under 35 U.S.C. 154(b) by 429 days.

(21) Appl. No.: 17/391,180

(22) Filed: Aug. 2, 2021

(65) Prior Publication Data

US 2022/0034046 A1 Feb. 3, 2022

(30) Foreign Application Priority Data

Aug. 3, 2020 (DE) ..................... 10 2020 120 381.0

(51) Int. Cl.

| | |
|---|---|
| ***E01C 19/23*** | (2006.01) |
| ***B06B 1/16*** | (2006.01) |
| ***E01C 19/28*** | (2006.01) |
| ***E01C 21/00*** | (2006.01) |
| ***E02D 3/026*** | (2006.01) |

(52) U.S. Cl.

CPC .............. *E01C 19/236* (2013.01); *B06B 1/16* (2013.01); *E01C 19/286* (2013.01); *E01C 21/00* (2013.01); *E02D 3/0265* (2013.01)

(58) Field of Classification Search

CPC ...... E01C 19/236; E01C 19/286; E01C 21/00; E02D 3/0265; B06B 1/16

USPC ......................... 404/113, 117, 121, 124, 127

See application file for complete search history.

(56) References Cited

U.S. PATENT DOCUMENTS 557,006 A * 3/1896 Miller ..................... E02D 3/026 404/124
1,560,295 A * 11/1925 Keeler .................... E01C 19/43 404/124
1,623,142 A * 4/1927 Walsh .................. E01C 19/236 404/124
1,744,272 A * 1/1930 La Plant ................ E01C 19/24 404/124

(Continued)

FOREIGN PATENT DOCUMENTS

CN 202440746 9/2012
DE 1853591 6/1962

(Continued)

OTHER PUBLICATIONS

European Patent Office, Search Report in EP 21183322.3, dated Nov. 26, 2021, 8 pages.
German Search Report filed in DE 10 2020 120 381.0.

*Primary Examiner* — Raymond W Addie

(74) *Attorney, Agent, or Firm* — Rankin, Hill & Clark LLP

(57) ABSTRACT

A soil preparation roller system for a soil preparation machine includes a roller body rotatable around a roller rotational axis having a carrier structure for the rotatable mounting of the roller body and having a carrier jacket supported on the radial outside on the carrier structure, a group of working jackets to be positioned abutting a carrier jacket outer side and providing a working outer side of a soil preparation roller. Each working jacket includes a plurality of working jacket segments to be arranged successively in the circumferential direction completely enclosing the roller body annularly, and the group of working jackets includes at least two working jackets having essentially equal mass to one another.

10 Claims, 6 Drawing Sheets

(56) References Cited

U.S. PATENT DOCUMENTS

| | | | | | |
|---|---|---|---|---|---|
| 4,632,599 | A * | 12/1986 | Sadahiro | E01C 19/236 404/124 |
| 5,421,670 | A * | 6/1995 | Meirick | E01C 19/43 404/124 |
| 5,511,901 | A * | 4/1996 | Yates | E01C 19/236 404/124 |
| 6,390,204 | B1 * | 5/2002 | Schafle | E02D 3/026 172/554 |
| 6,554,532 | B1 * | 4/2003 | Motz | E02D 3/046 404/124 |
| 8,007,200 | B2 * | 8/2011 | Brockway | E02D 3/039 404/124 |
| 8,690,475 | B2 * | 4/2014 | Springer | E02D 3/039 404/121 |
| 10,030,341 | B1 * | 7/2018 | Burger | E01C 19/23 |
| 2002/0114667 | A1 * | 8/2002 | Kaldenberg | E02D 3/026 404/124 |
| 2006/0255653 | A1 * | 11/2006 | Gibbins | E02F 9/2841 301/43 |
| 2007/0086861 | A1 * | 4/2007 | Pratt | E01C 19/43 404/124 |
| 2007/0280783 | A1 * | 12/2007 | Gibbins | E02D 3/026 404/124 |

FOREIGN PATENT DOCUMENTS

| | | | | |
|---|---|---|---|---|
| DE | 3427675 | | 2/1985 | |
| DE | 102010014068 | | 10/2011 | |
| DE | 102013006321 | | 10/2014 | |
| DE | 102013208261 | | 11/2014 | |
| EP | 3498919 | | 6/2019 | |
| GB | 1211568 | * | 3/1967 | E01C 19/236 |
| WO | 2006056767 | | 6/2006 | |

* cited by examiner

SOIL PREPARATION ROLLER SYSTEM FOR A SOIL PREPARATION MACHINE

The present invention relates to a soil preparation roller system for a soil preparation machine.

Soil preparation machines constructed having soil preparation rollers are used for preparing substrate in various regions. Thus, such soil preparation machines are used as soil compactors, for example, in road construction to compact asphalt material or the substrate lying under the asphalt material, wherein to obtain the smoothest possible surface of the compacted material, the compactor rollers provided in such soil preparation machines operating as soil compactors have an unstructured, thus essentially smooth and closed working outer side. For other working procedures, roller tools, for example, pad feet or chisels, can be provided to provide structured working outer sides on the soil preparation rollers.

A soil preparation machine is known from DE 34 27 675 A1, the soil preparation roller of which bears roller tools designed in the form of pad feet on a roller jacket, so that the soil preparation roller is fundamentally constructed having a structured working outer side. To also be able to use the soil preparation roller of this known soil preparation machine in working areas which require a smooth, unstructured working outer side, multiple casing segments which are successive in the circumferential direction can be fixed on the roller jacket by screw connections. When the casing segments are fixed on the soil preparation roller, they form a smooth, thus essentially unstructured working outer side which encloses the soil preparation roller having the pad feet provided on the roller jacket thereof. Depending on whether or not the soil preparation rollers are enclosed by the casing segments in this known soil preparation machine, the working outer side is provided either by the respective roller jacket of the soil preparation rollers rotatably supported on a frame or by the casing segments enclosing the roller jacket. As a result, depending on whether a soil preparation machine constructed in this way operates with or without casing provided on the soil preparation roller thereof, different mass ratios exist, whereby a respective work procedure to be carried out or the preparation result achievable in this case of the prepared soil is strongly influenced.

It is the object of the present invention to provide a soil preparation roller system for a soil preparation machine, using which it is possible to carry out working procedures substantially independently of the structure of the soil preparation roller system.

This object is achieved according to the invention by a soil preparation roller system for a soil preparation machine, comprising:

- a roller body rotatable around a roller rotational axis having a carrier structure for rotatable mounting of the roller body and having a carrier jacket supported radially on the outside on the carrier structure,
- a group of working jackets, which are to be positioned abutting a carrier jacket outer side and provide a working outer side of a soil preparation roller, wherein each working jacket comprises a plurality of working jacket segments to be arranged in succession in the circumferential direction completely enclosing the roller body annularly, wherein the group of working jackets comprises at least two working jackets having essentially equal mass to one another.

Since in the soil preparation roller system constructed according to the invention, at least two, preferably all working jackets of the group of working jackets have essentially equal masses to one another, in combination with the roller body respectively supporting these working jackets, an overall system of equal mass similarly results. Therefore, independently of which of the working jackets having essentially equal mass is attached to the roller body, it is ensured that equal mass is applied to the prepared soil.

This aspect of the soil preparation roller system constructed according to the invention therefore in particular or particularly advantageously comes to bear when the jacket of the roller body rotatably mounted around the roller rotational axis on the carrier structure is not a roller jacket providing a working outer side, but rather a carrier jacket on which a respective working jacket which provides a working outer side for a working procedure to be carried out is fixed or fixable as a separate assembly.

This means that in a soil preparation roller system constructed in this way, the carrier jacket of the roller body does not provide the working outside for preparing a soil in any operating state, and that in each operating state for preparing a soil, the working outer side is provided by the working jacket of the group of working jackets to be fixed in each case on the roller body as a separate assembly.

This has the result that independently of which working procedure is to be carried out using the roller body clad using one of the working jackets of the group of working jackets, it is ensured that the working system, thus the composite made up of roller body and selected working jacket, always has the same mass and therefore essentially the same load can always be applied to the prepared substrate.

Furthermore, with such an embodiment of the soil preparation roller system, the carrier jacket can be provided with structures which enable a defined and stable fixing of the working jacket constructed having multiple working jacket segments, without having to take into consideration that such structures, if they were provided on a working outer side of a soil preparation roller, could impair the preparation result, on the one hand, and could be subject to wear impairing the functionality thereof, on the other hand.

For such an embodiment of the soil preparation roller system having a roller body used only as a carrier, it can be provided that in each working jacket, each working jacket segment has a segment shell and a plurality of fastening elements protruding radially inward is arranged fixed on each segment shell on a segment shell inner side facing toward the carrier jacket outer side of the carrier jacket and/or supported on the carrier jacket outer side, and wherein a fastening element passage opening is provided in the carrier jacket in association with each fastening element and each fastening element passing through a fastening element passage opening protrudes on a carrier jacket inner side of the carrier jacket for fixing with respect to the roller body.

For stable fixing of the working jacket segments on the roller body, it is furthermore proposed that at least one fastening element is arranged fixed in each case on the segment shells in at least three connecting regions located at a distance to one another in the direction of the roller rotational axis.

To avoid negatively affecting a preparation procedure due to structures which could imprint themselves, for example, in the prepared soil, for example asphalt material, it is proposed that no openings penetrating the segment shells be provided on the segment shells in the region of the fastening elements. This means that the segment shells are also closed in particular in those regions in which fastening elements are provided thereon and therefore provide a continuous, non-interrupted outer surface.

For an adaptability to various working procedures to be carried out, the group of working jackets can comprise at least one working jacket having working jacket segments providing an essentially unstructured, closed working outer side of the working jacket, and can comprise at least one working jacket having working jacket segments providing a structured working outer side of the working jacket.

To obtain a structured working outer side, roller tools protruding radially outward can be arranged in at least one working jacket on the working jacket segments.

The provision of a uniform mass of a system comprising the roller body and in each case one of the working jackets is particularly advantageous if a vibration mechanism for generating a vibrational oscillation applied to the roller body is provided on the roller body. Such a vibrational oscillation can be generated, for example, by one or more unbalances rotating around the roller rotational axis having mass center of gravity eccentric in relation to the roller rotational axis. Such rotating unbalances generate a force acting radially to the roller rotational axis, which in the course of the rotation is also periodically oriented vertically upward, thus away from the soil to be prepared, and vertically downward, thus toward the soil to be prepared. By generating such an oscillation to be transmitted to the roller body and thus the casing supported thereon, the prepared soil is subjected not only to a static load generated by the weight of a soil preparation roller, but also to a dynamic load induced by the radially oriented vibrational acceleration. Because, according to the principles of the present invention, the system comprising the roller body and a respective working jacket has a defined total mass equal for multiple, preferably all working jackets, the static load and also the dynamic load do not change in working operation upon the change between various working jackets. This means that the oscillation system can be designed optimized to known and constant mass ratios with respect to the unbalance provided in the vibration mechanism, on the one hand, and the mass to be accelerated by the rotating unbalance, on the other hand.

In an embodiment which is particularly advantageous with respect to the compatibility of the working jacket segments, it is proposed that at least two working jackets be constructed having equal number of working jacket segments. This enables, for example, the working jacket segments of various working jackets to be combined with one another.

For this purpose, it can be provided in particular that at least two working jackets are constructed having segment shells of essentially identical outer circumferential structure in relation to one another.

Since, due to manufacturing tolerances and the wear occurring in the soil preparation operation, a state is fundamentally not achievable in which all working jackets have exactly the same mass and therefore the roller bodies will have the same total mass in conjunction with each of these working jackets, it is furthermore proposed that a mass of the at least two working jackets having essentially equal mass to one another is in the range of +/−15%, preferably in the range of +/−10%, most preferably in the range of +/−5% of a working jacket target mass, and/or that a mass of the at least two working jackets having essentially equal mass to one another is in the range of +/−15%, preferably in the range of +/−10%, most preferably in the range of +/−5% of a mean working jacket mass of these at least two working jackets having essentially equal mass to one another. This means that in the meaning of the present invention, working jackets, the mass deviation of which is in such a range, can be considered to be working jackets having essentially equal working jacket mass to one another, upon which it is ensured that also in conjunction with the mass of the roller body, a total mass is present using which the desired result of the soil preparation, in particular the desired compaction, can be ensured. This applies above all for the case that such a system made up of roller body and working jacket is associated with a vibration mechanism, which is designed to excite an oscillating system having defined mass.

The invention furthermore relates to a soil preparation machine having at least one soil preparation roller system constructed according to the invention.

The invention is described in more detail hereinafter with reference to the appended FIGURES. In the FIGURES.

Figure 1:
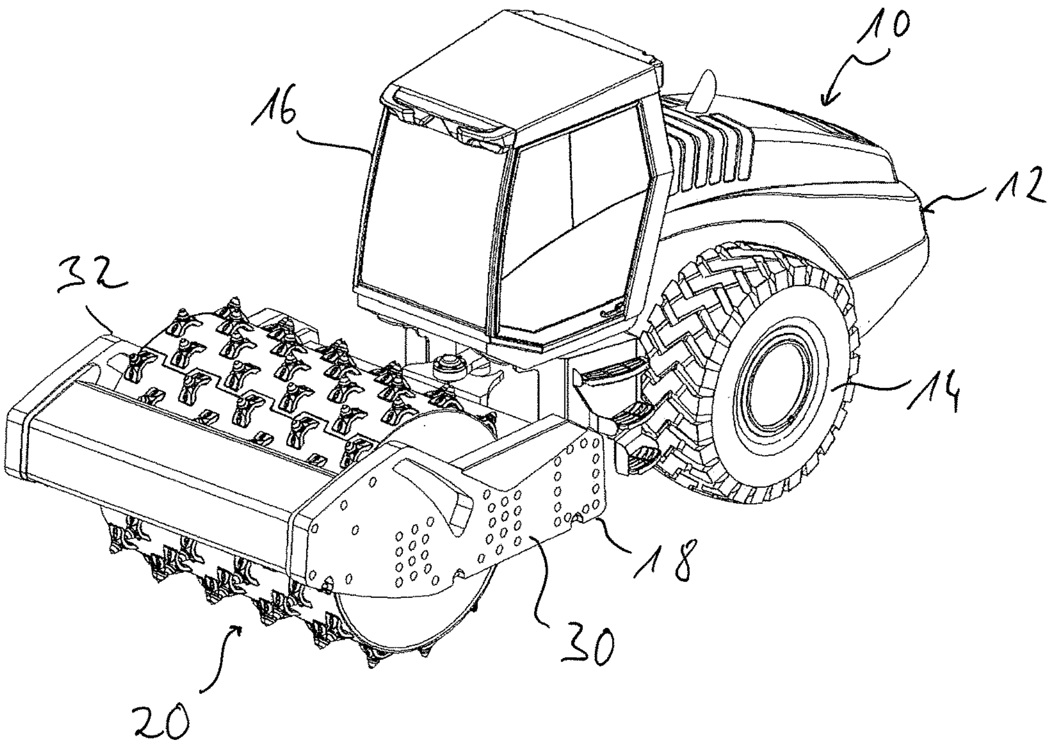
FIG. 1 shows a perspective view of a soil preparation machine having a soil preparation roller.

In FIG. 1, a soil preparation machine is identified in general with 10. The soil preparation machine 10 comprises a rear structure 12 having a drive assembly provided thereon and wheels 14 driven by the drive assembly, for example a diesel internal combustion engine. Furthermore, a cab 16 for an operator operating the soil preparation machine 10 is provided on the rear structure 12.

Figure 2:
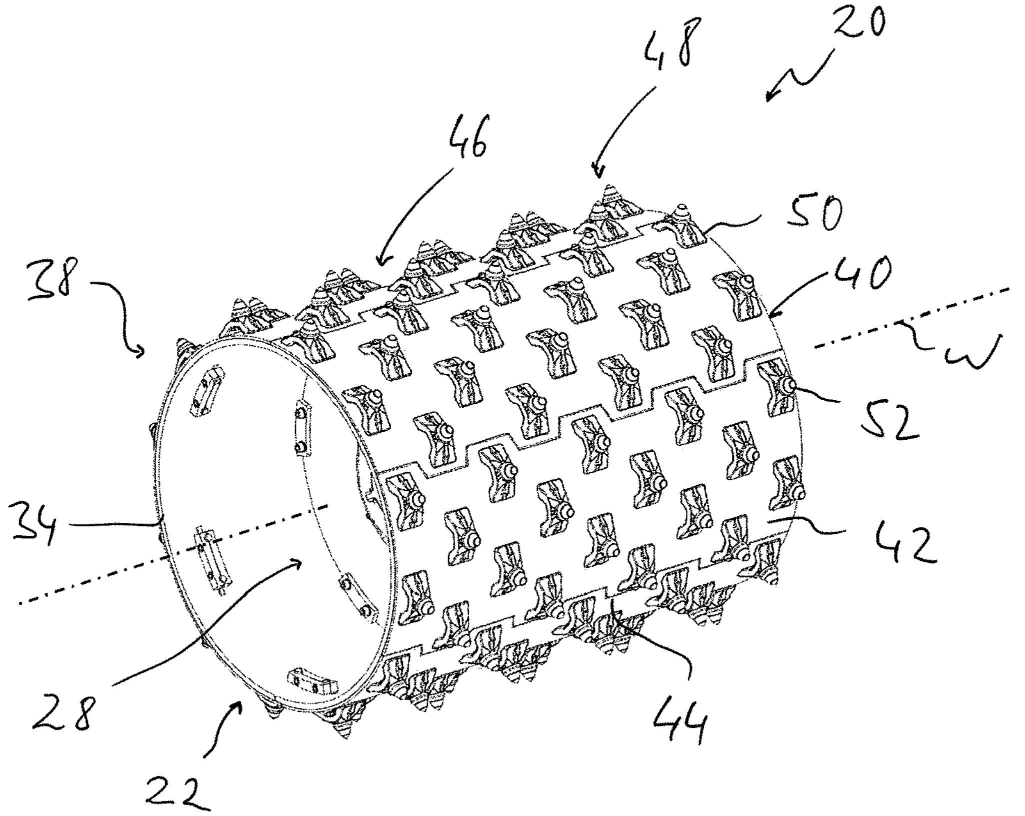
FIG. 2 shows the soil preparation roller of the soil preparation machine of FIG. 1 in a perspective view.
Figure 3:
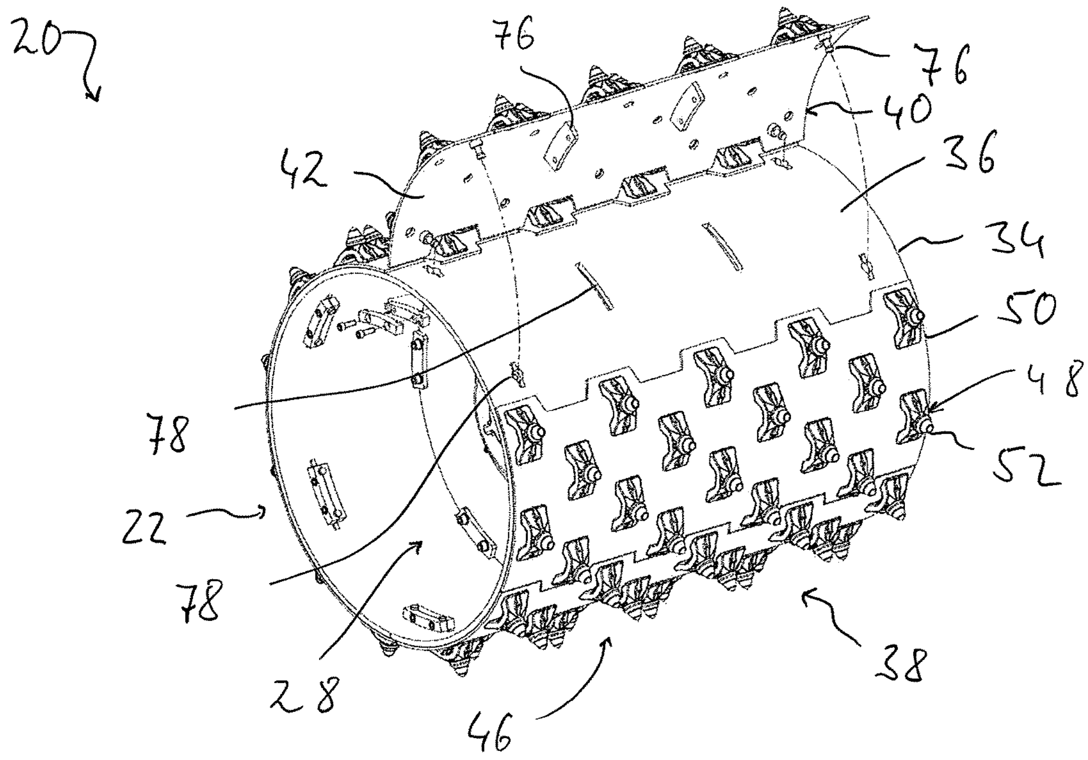
FIG. 3 shows the soil preparation roller of FIG. 2 having a working jacket segment, which is detached from a roller body of the soil preparation roller, of a working jacket provided on the roller body.

A soil preparation roller, which is identified in general by 20, is supported rotatably around a roller rotational axis W on a front structure 18 pivotably connected to the rear structure 12. The soil preparation roller 20 shown in greater detail in FIG. 2 is constructed using a roller body 22 rotatably mounted on the front structure 18. The roller body 22 comprises a carrier structure 28, which is constructed in the illustrated exemplary embodiment using two carrier disks 24, 26, which are generally also referred to as circular blanks and are arranged at an axial distance to one another, and which are rotatably supported around the roller rotational axis W via respective mounting regions on lateral frame regions 30, 32 of the front structure 18. In the outer circumferential region thereof, the two carrier disks 24, 26 are fixed, for example, by welding on an essentially cylindrical and annular closed carrier jacket 34.

A working jacket identified in general by 38 is provided on a carrier jacket outer side 36. The working jacket 38 comprises in the illustrated exemplary embodiment six working jacket segments 40, which are in succession in the circumferential direction and directly adjoin one another, and which have curved segment shells 42 adapted to the circularly curved outer circumferential contour of the carrier jacket 34. It can be seen in FIG. 2 that the segment shells 42 engage in one another like teeth in the segment shell longitudinal edges 44 thereof adjoining one another in the circumferential direction. Alternatively, the segment shell longitudinal edges 44 could also be formed extending linearly in the direction of the roller rotational axis W.

The compactor roller 20 is formed in this illustrated exemplary embodiment as a so-called ground breaker roller and has for this purpose a plurality of roller tools 48 on a working outer side 46 of the working jacket 38 on each of the working jacket segments 40. In the illustrated example, these roller tools 48 are formed having a quick-change tool holder 50, which is fixed on a respective working jacket segment 40 by welding, for example, and a replaceable tool 52 in the form of a chisel received in the quick-change tool holder.

Each of the working jacket segments 40, which are preferably formed identically to one another and are constructed essentially mirror symmetrically with respect to a longitudinal center, has four connecting regions 54, 56, 58, 60 at an axial distance to one another in the direction of the roller rotational axis W. The working jacket segments 40 can be fixed on the carrier jacket 34 of the roller body 22 in each of these four connecting regions 54, 56, 58, 60, so that a stable attachment to the roller body 22 is ensured over the entire axial length of the working jacket segments 40. The connecting regions 54, 60 located in the axial end regions 62, 64 of the working jacket segments 40 each form an end connecting region 66 or 68, respectively, while the connecting regions 56, 58 positioned closer to the longitudinal center region of the working jacket segments 40 each form a middle connecting region 70, 72.

In each of the connecting regions 54, 56, 58, 60, one or more fastening elements 76 are provided on a shell segment inner side 74 of the segment shells 42 facing toward the carrier jacket outer side 36. The fastening elements 76 provided in the middle connecting regions 70, 72 are formed plate-like and are fixed, for example, by welding on the segment shells 42 in such a way that they extend essentially in the circumferential direction and radially inward. In association with these plate-like fastening elements 76, which are arranged in the middle connecting regions 70, 72 and extend essentially in the circumferential direction, slotted fastening element passage openings 78 essentially elongated in the circumferential direction are provided in the carrier jacket 34. These openings, as can be seen in FIG. 5, are arranged axially directly adjacent to a respective carrier disk 24, 26 of the carrier structure 28.

In association with each such slotted fastening element passage opening 78 or in association with each fastening element 76 of the middle connecting regions 70, 72 to be positioned by passing through such a fastening element passage opening 78, a fastening region 80 is formed on the roller body, which is radially overlapped by a fastening element 76 to be fixed thereon. In the illustrated exemplary embodiment, these fastening regions 80 are formed on the radially outer region of a respective carrier disk 24 or 26 and each comprise two openings 82, 84, which are provided with internal threads, for example. During the attachment of a respective working jacket segment 40 to the roller body 22, the plate-like fastening elements 76 of the middle connecting regions 72, 74 are led through the fastening element passage openings 78 provided axially directly adjacent to the carrier disk 24, 26, so that they protrude radially inward on a carrier jacket inner side 86. Threaded bolts can be guided essentially axially through openings 88, 90 provided in these fastening elements 76 and screwed into the openings 82, 84 of the respective associated fastening region 80. Plate springs or lock rings or the like can be positioned, for example, between the bolt heads and the respective fastening elements 76, for example, to obstruct or prevent loosening of the threaded bolts.

Figure 5:
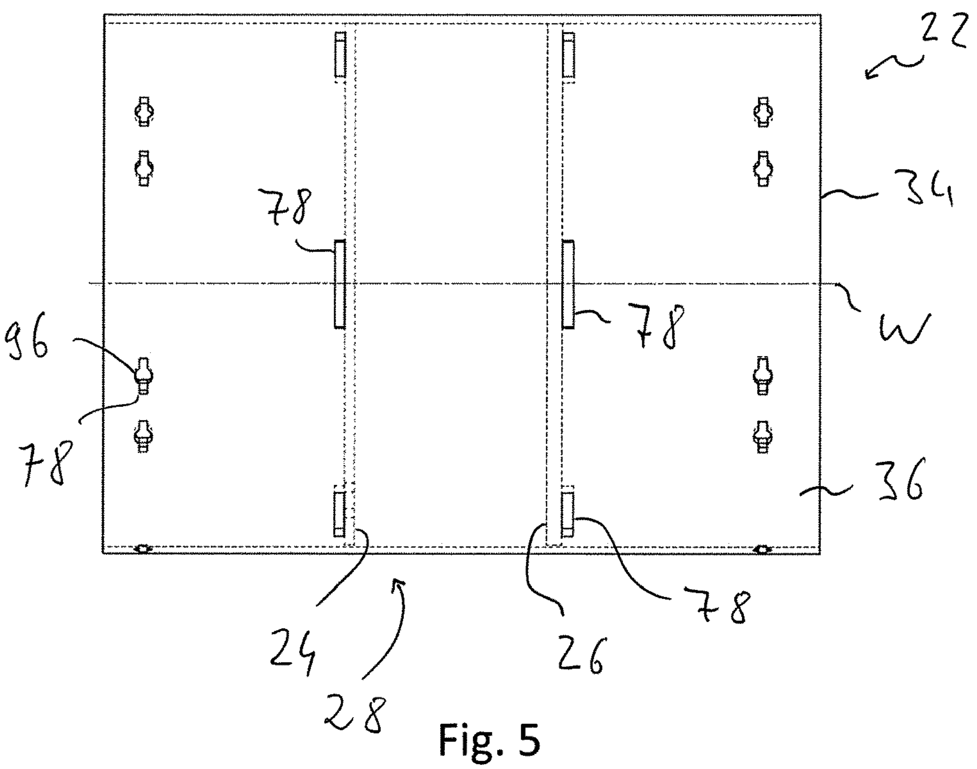
FIG. 5 shows the roller body of the soil preparation roller of FIGS. 2 and 3 viewed radially from the outside.
Figure 6:
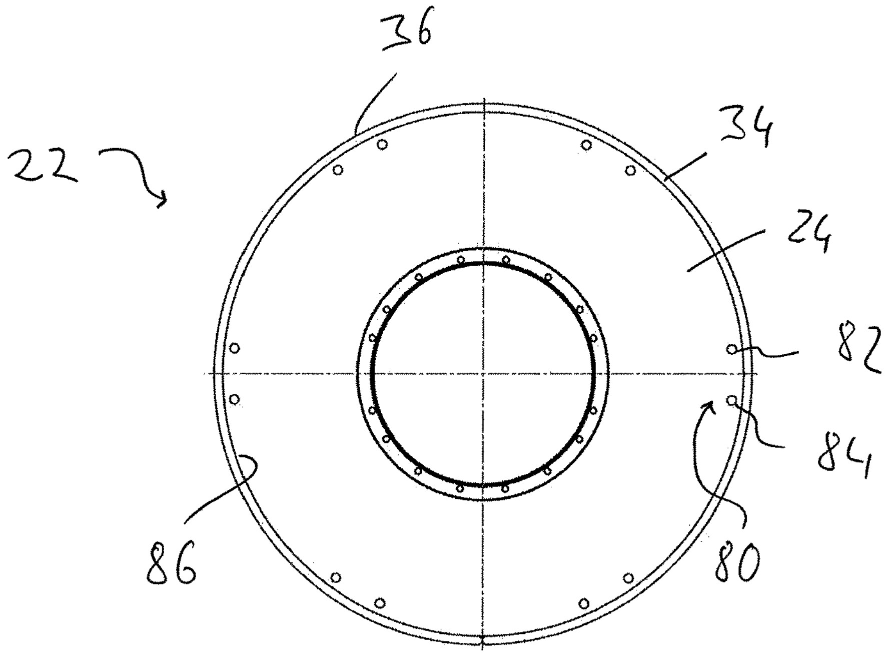
FIG. 6 shows an axial view of the roller body of FIG. 5.

It can be seen in FIG. 5 that the fastening element passage openings 78 provided directly adjacent to a respective carrier disk 24, 26 are each positioned on the side thereof facing axially away from one another with respect to the carrier disks 24, 26, so that the fastening elements 76 of the middle connecting regions 70, 72 to be fixed by the use of threaded bolts on the carrier disks 24, 26 can be fixed easily from the outside by means of the threaded bolts on the carrier disks 24, 26.

The fastening elements 76 provided in the end connecting regions 66, 68 are formed like bolts and extend essentially radially inward on the working jacket segment inner side 74. As is recognizable in FIG. 7, these bolt-like fastening elements 76 are constructed having a bolt base 94 expanded with respect to a bolt shaft 92, which can be fixed by welding on a respective segment shell 42, so that the bolt-like fastening elements 76 of the end connecting regions 66, 68 are also arranged fixed on the segment shells 42. It can be seen that an opening is not formed in the region of any of the fastening elements 76 in the segment shell 42 respectively supporting them, for example, to be able to guide a respective fastening element through a segment shell 42. This has the result that in particular in those regions in which fastening elements 76 are arranged on the segment shells 42, no openings which are subject to wear or could impair a working result are formed, for example, on the outer side of the segment shells 42 exposed to the outside. In the illustrated exemplary embodiment, openings are only formed in the segment shells 42 in the region of the roller tools 48 to have access to the replaceable tools 52 from the inside and thus be able to release them from the quick-change tool holders 50. However, these openings are covered on the outside by the quick-change tool holders 50, so that the risk of the penetration of material through these openings or the risk of wear in the region of these openings is not provided.

In association with the bolt-like fastening elements 76 provided in the end connecting regions 66, 68, similarly slotted bolt element passage openings 78 essentially elongated in the circumferential direction are provided in the carrier jacket 34. These fastening element passage openings 78 arranged in the axial end regions of the carrier jacket 34 have an expansion in a longitudinal region 96 located in the longitudinal center thereof. The bolt bases 94 of the bolt-like fastening elements 76 to be positioned in an engaging manner in these fastening element passage openings 78 can be received in these expansions.

Figure 4:
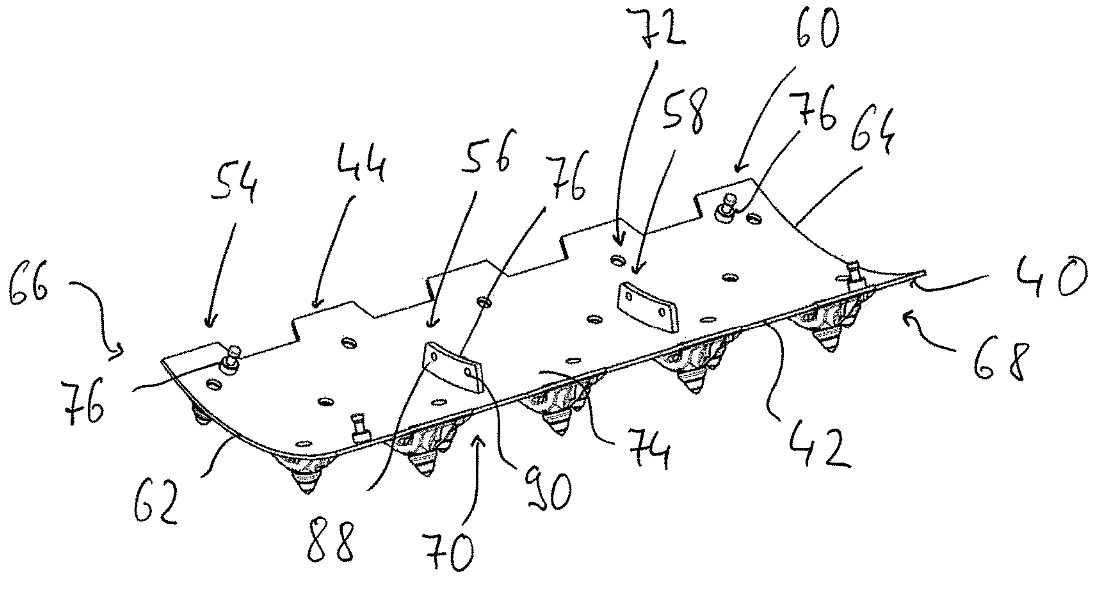
FIG. 4 shows a working jacket segment observed on its inner side.
Figure 7:
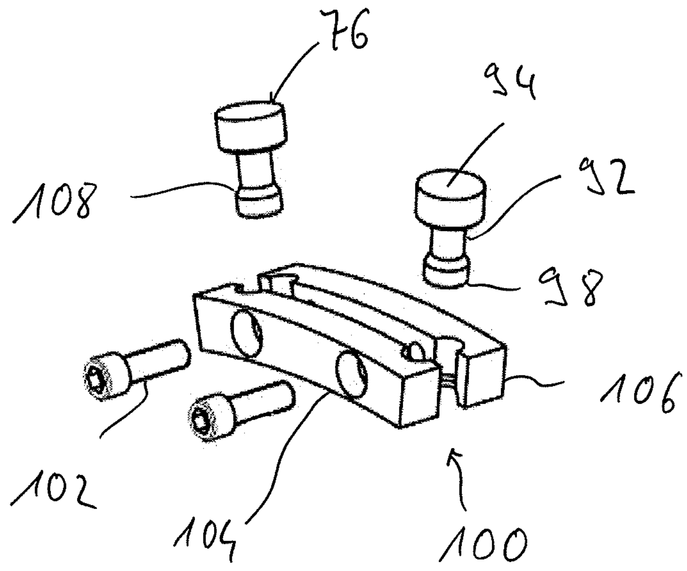
FIG. 7 shows a clamping jaw arrangement, interacting with bolt-like fastening elements, for fixing a working jacket segment on the roller body.
Figure 8:
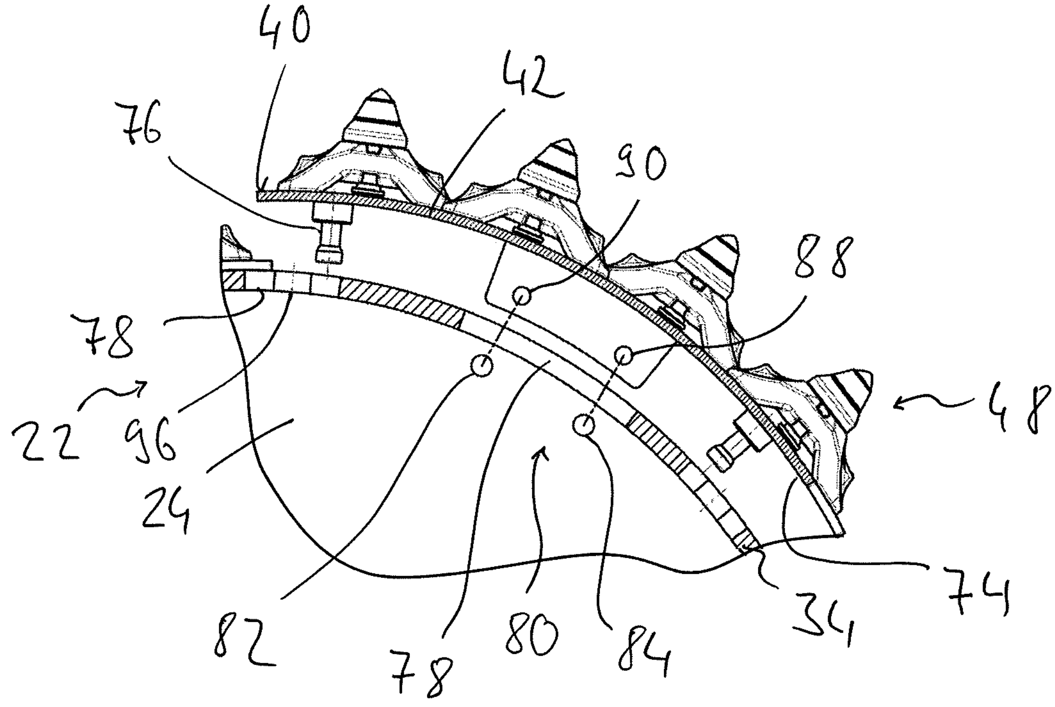
FIG. 8 shows a working jacket segment illustrated radially detached from the roller body.
Figure 9:
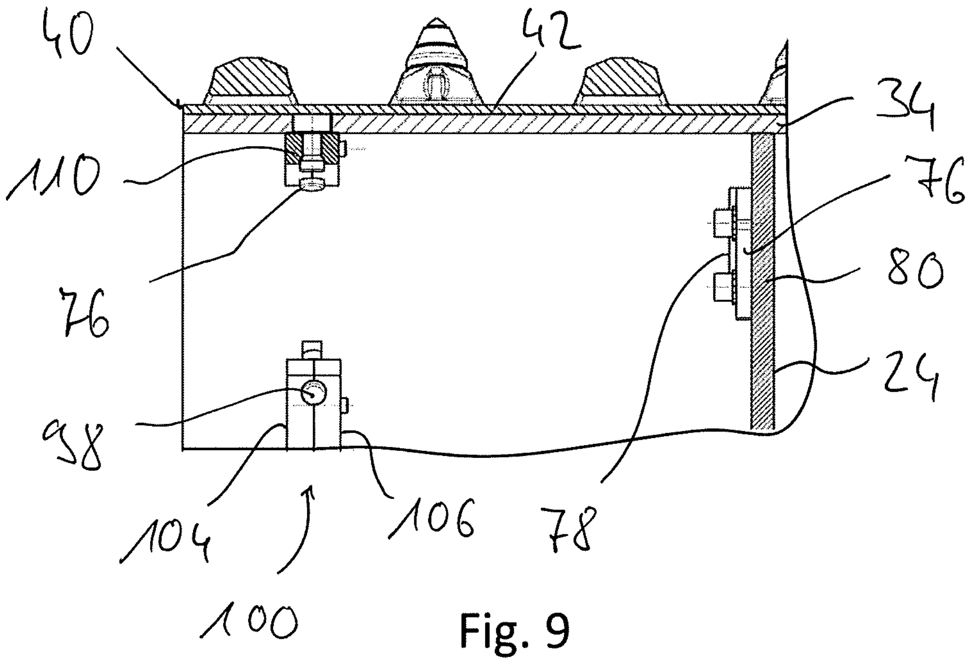
FIG. 9 shows an axial end region of a soil preparation roller having a working jacket segment fixed on the roller body by clamping jaw arrangements of FIG. 7.

As can be seen in FIG. 7, these bolt-like fastening elements 76 each have a bolt head 98 expanded with respect to the bolt shaft 92 on the end regions thereof protruding radially inward. The bolt-like fastening elements 76 protrude radially inward with the respective bolt shaft 92 and bolt head 98 thereof on the carrier jacket inner side 36 and are enclosed in these regions by a clamping jaw arrangement 100 associated with each pair of such bolt-like fastening elements 76. Each clamping jaw arrangement 100 has two clamping jaws 104, 106, which axially oppose one another and are to be fixed on one another by threaded bolts 102. The two bolt-like fastening elements 76 enclosed by such a clamping jaw arrangement 100 are each associated with different working jacket segments 40 directly adjacent to one another. As is recognizable in FIG. 4, for this purpose the bolt-like fastening elements 76 arranged in a respective end connecting region 66, 68 are arranged close to the segment shell longitudinal edges 44, so that the bolt-like fastening elements 76 arranged on adjacent working jacket segments 40 and enclosed by a common clamping jaw arrangement 110 are located closer to one another than the two bolt-like fastening elements 76 arranged in a respective end connecting region 66, 68 of the working jacket segments 40.

In respective clamping jaws 104, 106 enclosing a pair of such bolt-like fastening elements 76, these abut the segment shell inner side 74 of the associated segment shells 42 and generate a force action applied radially inward to the enclosed, bolt-like fastening elements 76, so that the working jacket segments 40 are pulled tight against the carrier jacket outer side 36. For these purposes, the bolt-like fastening elements 76 each have conical wedge surfaces 108 on the bolt heads 98 thereof, which interact with respective wedge surfaces 110 on the clamping jaws 104, 106 to generate this force oriented radially inward.

The soil preparation roller described above with reference to FIGS. 1-9 is distinguished in that it has a structure fundamentally divided into two system regions. A first of the system regions, namely the roller body, is rotatably supported on a machine frame of a soil preparation machine and forms a carrier for a second of the system regions, namely the working jacket. In working operation of such a soil preparation roller, exclusively the working jacket comes into contact using its working outer side with the substrate to be prepared. The roller body is always covered by the working jacket, so that the roller body itself, with the essentially unstructured, smooth outer side of its carrier jacket, is not subject to wear, on the one hand, and can be designed optimally for the attachment of the working jacket, on the other hand. In particular, the carrier jacket can have openings for this purpose in various longitudinal regions and various circumferential regions, through which fastening elements can be guided for fixing the working jacket segments. Since in working operation all of these openings are covered by the working jacket, the risk that contaminants will enter through these openings does not exist, nor does the risk exist that these openings will be imprinted in the substrate to be prepared.

Figure 10:
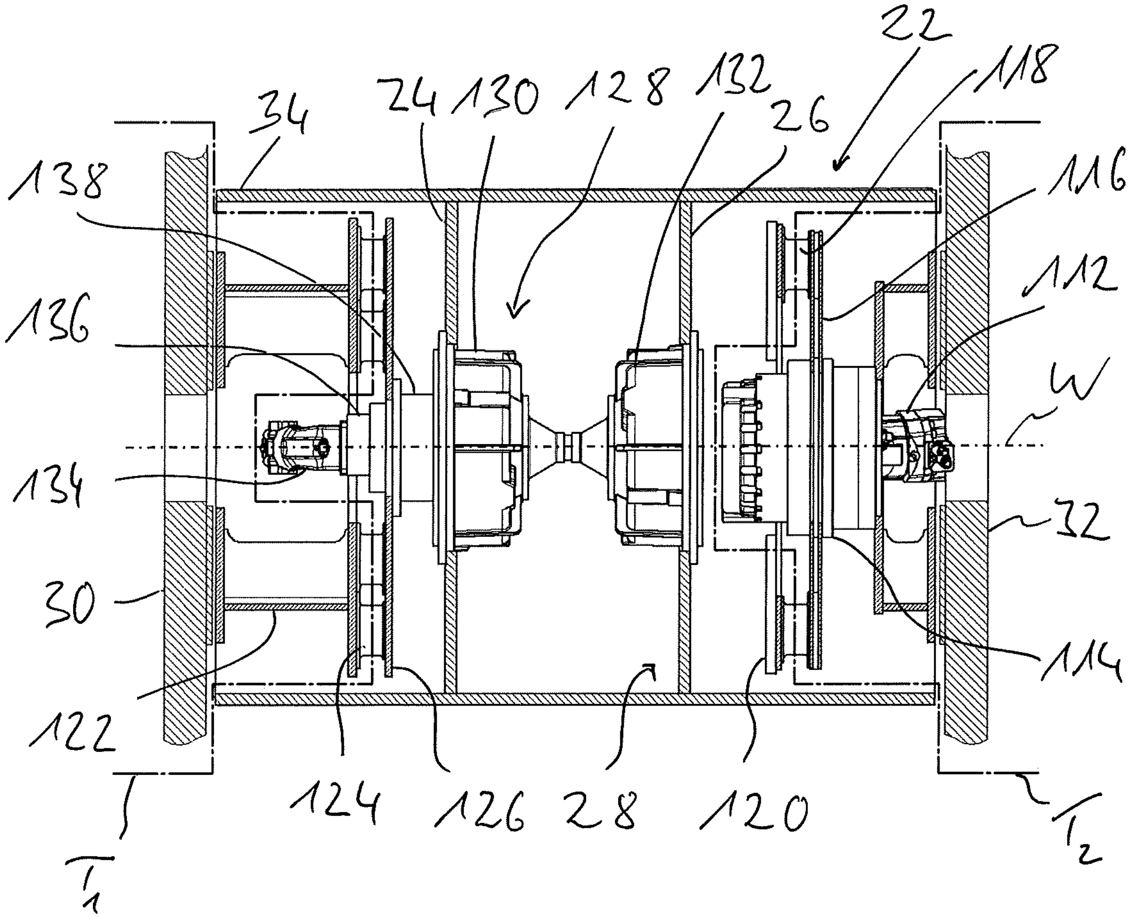
FIG. 10 shows the roller body supported on a frame of a soil preparation machine in longitudinal section.

In FIG. 10, the roller body 20 rotatably supported on the two frame regions around the roller rotational axis W is shown in longitudinal section. The roller body 22 shown in FIG. 10 is provided for a compactor roller 20 designed for rotation around the roller rotational axis W by means of a roller drive motor 112. A rotor 114 of the roller drive motor 112 generally designed as a hydraulic motor is coupled via a, for example, disk-like carrier 116 and a plurality of elastic suspension elements 118, which are arranged in succession in the circumferential direction and are formed as rubber cushions, for example, on, for example, coupling elements 120 fixed on the inner circumference of the carrier jacket 34, so that with provision of an elastic suspension, the roller body 22 is suspended rotatably or driven to rotation with respect to the frame region 32.

A suspension arrangement 122 is carried essentially fixedly on the frame region 30. The suspension region 122 supports a plurality of elastic suspension elements 124, which are in succession in the circumferential direction and are also formed, for example, as rubber cushions. These are coupled to a coupling element 126, which is disk-like, for example. Since the suspension arrangement 122 is fixedly coupled on the frame region 30, the suspension elements 124 and the disk-like coupling element 126 are also not rotatable around the roller rotational axis W.

Furthermore, a vibration mechanism identified in general by 128 is provided in the interior of the roller body 22. In the illustrated exemplary embodiment, this comprises two unbalances, which are arranged in respective housings 130, 132 and are rotatable around the roller rotational axis W, having mass center of gravity eccentric to the roller rotational axis W. The mass centers of gravity of the two unbalance masses are preferably located in the same circumferential region. The two unbalances are drivable to rotate around the roller rotational axis W by an unbalance drive motor 134, which is also designed as a hydraulic motor, for example. A stator region 136 of the unbalance drive motor 134 is supported on the disk-like coupling element 126. A rotor region of the unbalance drive motor 134 drives the two unbalances to rotate around the roller rotational axis W via a shaft (not shown in FIG. 10). Furthermore, a housing-like coupling element 138 is rotationally decoupled with respect to the disk-like coupling element 126 via a bearing (not shown). The housing-like coupling element 138 is furthermore fixed on the carrier disk 24 of the carrier structure 28, so that in this region the roller body 22 is rotatably mounted with respect to the frame region 30.

It is to be noted that such a roller body 22 constructed having a vibration mechanism 128 can also be designed as a nondriven roller body. In this case, on the side shown on the right in FIG. 10, for example, a fixed coupling of the elastic suspension elements 118 on the frame region 32 is provided, for example via a suspension arrangement as shown in the form of the suspension arrangement 122 in association with the left end region in FIG. 10.

FIG. 10 shows each of two partition lines $T_1$, $T_2$ using dot-dash lines, which show the system region suspended elastically via the elastic suspension elements 118, 124 and thus essentially oscillation-decoupled from the front structure 18. This system region is also associated, for example, with the unbalance drive motor 134, while the roller drive motor 112 is essentially fixedly coupled to the frame region 32 of the front structure. In terms of the present invention, the region bounded by the partition lines $T_1$, $T_2$ can be considered as the region which defines the roller body 22 or its mass to be considered in particular with respect to an oscillation excitation. Alternatively, the entire region rotating in operation can be considered.

In soil preparation operation, the roller body 22 enclosed by the working jacket 38 is subjected to the vibration mechanism 128 and thus also periodically accelerated essentially vertically upward and downward. A soil preparation roller 20 thus constructed or operated therefore loads the prepared soil not only by the static load generated due to the mass of the soil preparation roller 20, but also due to the dynamic load generated by the operation of the vibration mechanism 128.

The acceleration of the soil preparation roller 20 generated by the vibration mechanism 128 is essentially dependent on the mass of the soil preparation roller 20 to be accelerated, the unbalance and the speed of the unbalanced masses, the mass centers of gravity of which, which are eccentric to the rotational axis, thus to the roller rotational axis, define with the radial distance thereof to the roller rotational axis W the unbalance of the vibration mechanism. To be able to provide defined working conditions in soil preparation operation using such a soil preparation roller, it is advantageous or desirable to operate the vibration mechanism 128 provided having defined structure in a defined manner, thus in particular at defined speed. This operation of the vibration mechanism and the structure of the vibration mechanism 128 are adapted here to the mass of the soil preparation roller to be accelerated thereby. If its mass is excessively low, there is the risk that the soil preparation roller will jump excessively strongly in operation of the vibration mechanism 128. If the mass of the soil preparation roller 20 is excessively large, there is the risk that the acceleration or movement of the soil preparation roller 20 in the vertical direction generated by the vibration mechanism 128 is excessively small and the desired preparation result thus cannot be obtained.

For this reason, in the above-described structure of a soil preparation roller 20, the roller body 22 and the working jacket 38 enclosing it are each adapted using the masses provided thereby in a defined manner to the operation to be carried out by the vibration mechanism 128. If excessive wear of the working jacket 38 occurs in operation not only in the region of the replaceable tools 52 supported thereon, but also, for example, in the region of the respective segment shells 42, which would result in excessively strong reduction of the mass of the working jacket 38 and thus also of the total mass of the system consisting of roller body 22 and working jacket 38, there is the option of replacing only a section of the soil preparation roller, namely the working jacket 38, with another working jacket which is not worn or is less worn.

Figure 11:
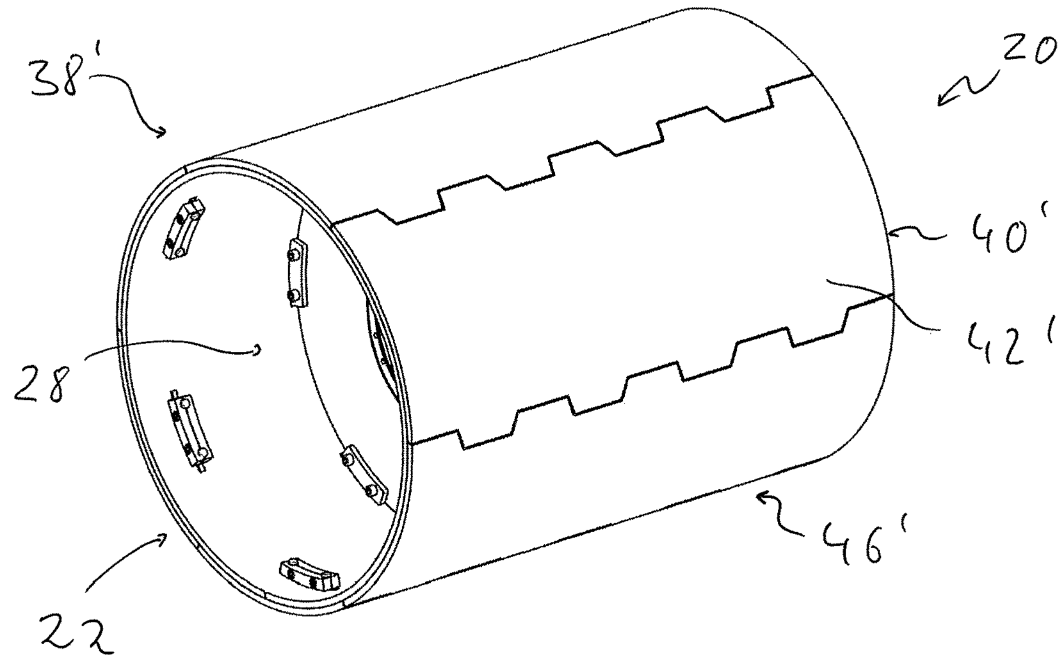
FIG. 11 shows an illustration corresponding to FIG. 2 of a soil preparation roller having a different type of embodiment of a working jacket enclosing the roller body.
Figure 12:
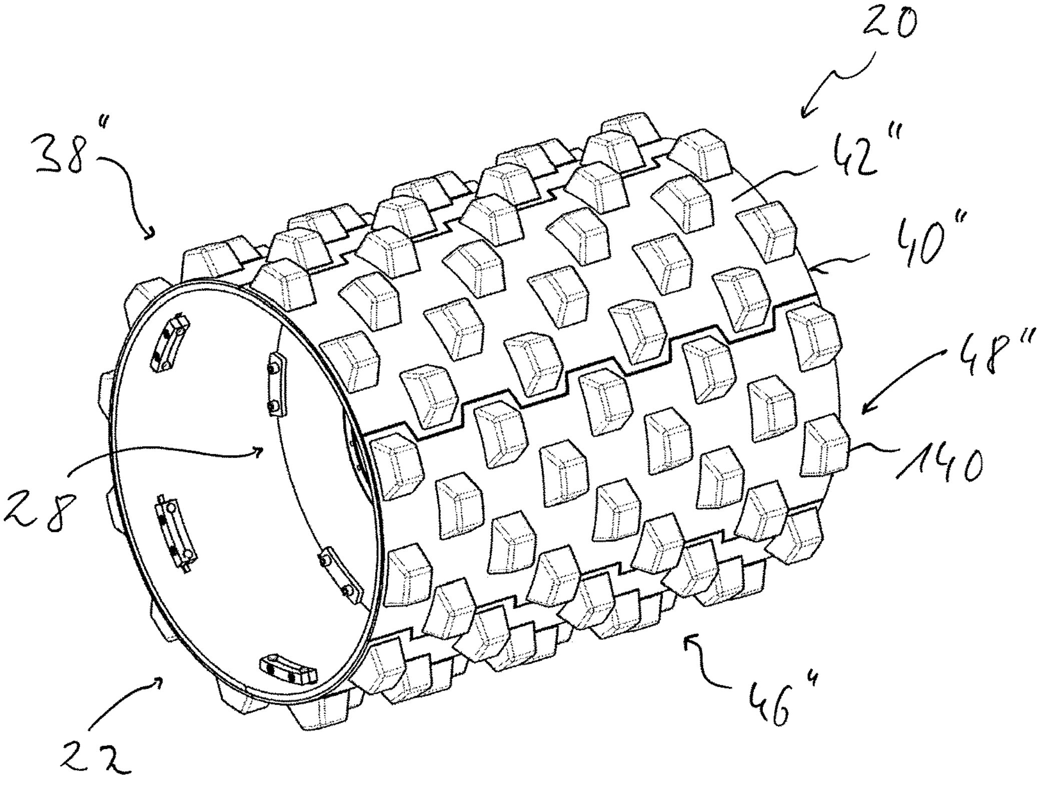
FIG. 12 shows a further illustration corresponding to FIG. 2 of a soil preparation roller having a different type of embodiment of the working jacket enclosing a roller body.

Furthermore, according to the principles of the present invention, the above-described working jacket 38, which supports a plurality of roller tools 48 each having a quick-change tool holder 50 and a replaceable tool 52, is a working jacket 38 of a group of, for example, differently procured working jackets, which can all be used in conjunction with the same roller body 22. FIGS. 11 and 12 show other working jackets 38', 38", which are differently procured on the working outer side 46', 46" thereof than the above-described working jacket 38. Thus, the working jacket 38' of FIG. 11 is procured smooth on its working outer side 46'. The working jacket segments 40' of this working jacket 38' are thus constructed with segment shells 42' procured essentially smooth or unstructured on the outer sides thereof. Such a working jacket 48' can be used, for example, for compacting asphalt material or for compacting the substrate to be provided under asphalt material.

The working jacket 38' shown in FIG. 12 is distinguished by a strongly structured working outer side. For this purpose, roller tools 48" in the form of pad feet 140 are provided on the segment shells 42" of the working jacket segments 40". These can be fixed on the segment shells 42" by welding, for example, or can be replaceably supported thereon using the above-described quick-change tool holders.

According to the principles of the present invention, the working jackets 38, 38', 38" are constructed so that they all have the same mass. Independently of which working jacket 38, 38', 38" is attached to the roller body 22, an overall system having the same mass in each case is thus obtained, so that independently of which of the working jackets 38, 38', 38" is attached to the roller body 22, the operation of the vibration mechanism 28 results in each case in the same movement behavior or oscillation behavior of the soil preparation roller 20.

It is to be noted that, for example, the provision of equal masses in the working jackets 38, 38', 38" with and without roller tools can be achieved in that in the unstructured working jacket 38' shown in FIG. 11, which is thus not provided with roller tools, the segment shells 42' are formed having thicker structural material than in the working jackets 38, 38", in which a not insignificant part of the total mass is provided in the form of the roller tools 48, 48" provided on the segment shells 42, 42".

It is also to be noted that, of course, in all working jackets 38, 38', 38" of such a group of working jackets 38, 38', 38", the same structural measures can be provided or are provided to be able to attach the respective working jacket segments 40, 40', 40" to the roller body 22. The roller body 22, which in the above-described embodiment does not itself provide a working outer side which comes into contact with the substrate to be prepared, can be provided in particular in the region of its carrier jacket 34 within thinner structural material, since, on the one hand, the carrier jacket 34 is essentially subject to no load resulting in the wear thereof and, on the other hand, due to the connection to a respective working jacket 38, 38', 38" having respective segment shells 40, 40', 40", which essentially completely cover the carrier jacket 34, a total thickness of the overall jacket thus formed is obtained which takes into consideration the loads occurring in operation. For example, this total thickness can correspond to that of the thickness of a jacket of a conventional soil preparation roller constructed using a layer of steel material, as is used, for example, for compacting asphalt material.

By way of the present invention, due to the combination of a roller body with a plurality of a for example, differently designed working jackets, a soil preparation roller system is provided which can be easily adapted by the selection of a working jacket suitable for a respective preparation procedure, without it being necessary, for example, to replace an entire soil preparation roller. This soil preparation roller system thus permits not only a simple adaptation of a soil preparation roller to various soil preparation procedures, for example, the compaction of asphalt, the compaction of earth or rock material, or the crushing of solid substrate, for example, concrete substrate, without an impairment of the oscillation behavior being introduced due to the change of a working jacket. Rather, there is also the option, upon the occurrence of wear of a working jacket, to replace it with a different or new working jacket, so that it can be ensured that the total weight of the composite made up of roller body and working jacket, again independently of the nature of the working jacket, remains in a value range optimal in consideration of the operation of the vibration mechanism. Such a value range, in which the total mass of the composite made up of roller body and working jacket and thus the total mass of a soil preparation roller can be considered to be in an optimum range in consideration of the operation of the compaction mechanism and thus as equal or essentially equal in terms of the present invention, can be defined, for example, by a deviation of the mass of the working jackets having mass essentially equal to one another in the range of +/−15%, preferably in the range of +/−10%, most preferably in the range of +/−5%, from a working jacket target mass, and/or can be defined by a deviation in the range of +/−15%, preferably in the range of +/−10%, most preferably in the range of +/−5%, from a mean working jacket mass of this working jacket having mass essentially equal to one another.

As long as the various working jackets having essentially equal mass to be combined with a roller body to produce an overall system are in this deviation range with respect to the masses thereof, independently of whether the mass deviation occurs due to manufacturing tolerances or whether the abrasion occurring in operation results in the mass deviation, a soil preparation operation can be carried out, using which the desired work result can be achieved, in particular if this is carried out using the above-explained vibration mechanism, which is designed with respect to its unbalance and its working frequency for a defined mass of the system to be excited to oscillations. Greater deviations, in particular deviations of greater than 20%, result in such a detuning of the oscillation system that efficient operation thereof is no longer ensured.

It is furthermore to be noted that, of course, a soil preparation roller system according to the invention, in addition to multiple working jackets each to be combined with the roller body having essentially equal mass to one another, can also have one or more working jackets having mass deviating to a greater extent, for example, if a special preparation procedure requires a very large or very small mass of the system roller body-working jacket.

The invention claimed is:

1. A soil preparation roller system for a soil preparation machine, comprising:

a roller body rotatable around a roller rotational axis having a carrier structure for rotatable mounting of the roller body and having a carrier jacket supported radially on the outside on the carrier structure, said carrier jacket having a carrier jacket outer side, said carrier jacket outer side not providing a working outer side for coming into contact with a substrate to be prepared, a group of working jackets, each working jacket of said group of working jackets being provided for being positioned abutting said carrier jacket outer side for providing the working outer side of a soil preparation roller comprising said carrier jacket and one of said working jackets positioned such as to about and surround said carrier jacket outer side, wherein each working jacket comprises a plurality of working jacket segments to be arranged in succession in the circumferential direction completely enclosing the roller body annularly, wherein the group of working jackets comprises at least two working jackets having essentially equal mass to one another.

2. The soil preparation roller as claimed in claim 1, wherein a vibration mechanism for generating a vibrational oscillation applied to the roller body is provided on the roller body.

3. The soil preparation roller as claimed in claim 1, wherein at least two working jackets are constructed having equal number of working jacket segments.

4. The soil preparation roller as claimed in claim 1, wherein at least two working jackets are constructed having segment shells of essentially identical outer circumferential structure to one another.

5. The soil preparation roller as claimed in claim 1, wherein a mass of the at least two working jackets having essentially equal mass to one another is in the range of +/−15% of a working jacket target mass, and/or that a mass of the at least two working jackets having essentially equal mass to one another is in the range of +/−15% of a mean working jacket mass of these at least two working jackets having essentially equal mass to one another.

6. A soil preparation machine, comprising at least one soil preparation roller system as claimed in claim 1.

7. The soil preparation roller system as claimed in claim 1, wherein in each working jacket, each working jacket segment has a segment shell and on each segment shell, a plurality of fastening elements protruding radially inward is arranged fixed on a segment shell inner side facing toward the carrier jacket outer side of the carrier jacket and/or supported on the carrier jacket outer side, and wherein a fastening element passage opening is provided in the carrier jacket in association with each fastening element and each fastening element passing through a fastening element passage opening protrudes on a carrier jacket inner side of the carrier jacket for fixing with respect to the roller body.

8. The soil preparation roller as claimed in claim 7, wherein in each one of at least three connecting regions located at a distance to one another in the direction of the roller rotational axis, at least one fastening element is fixedly arranged on each one of the segment shells.

9. The soil preparation roller as claimed in claim 1, wherein the group of working jackets comprises at least one working jacket having working jacket segments providing an essentially unstructured, closed working outer side of the working jacket, and in that the group of working jackets comprises at least one working jacket having working jacket segments providing a structured working outer side of the working jacket.

10. The soil preparation roller as claimed in claim 9, wherein in at least one working jacket having the structured working outer side, roller tools protruding radially outward are arranged on the working jacket segments-f.

* * * * *